US012561236B2

(12) United States Patent
Tsang et al.

(10) Patent No.: US 12,561,236 B2
(45) Date of Patent: Feb. 24, 2026

(54) PREDICTING USER ACCEPTANCE OF FEATURES AND FUNCTIONS OF SOFTWARE PRODUCT

(71) Applicant: International Business Machines Corporation, Armonk, NY (US)

(72) Inventors: Nicholas Tsang, Saratoga, CA (US); Adriana Valido, Miami Dade, FL (US); Tracy Canada, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 17/480,328

(22) Filed: Sep. 21, 2021

(65) Prior Publication Data

US 2023/0090168 A1 Mar. 23, 2023

(51) Int. Cl.
G06F 11/36 (2025.01)
G06F 11/30 (2006.01)
G06F 11/34 (2006.01)
G06F 11/3668 (2025.01)
G06F 11/3698 (2025.01)

(52) U.S. Cl.
CPC ........ G06F 11/3698 (2025.01); G06F 11/302 (2013.01); G06F 11/3438 (2013.01); G06F 11/3495 (2013.01); G06F 11/3668 (2013.01)

(58) Field of Classification Search
None
See application file for complete search history.

(56) References Cited

U.S. PATENT DOCUMENTS

| | | | |
|---|---|---|---|
| 9,075,911 B2 | 7/2015 | Mohan et al. | |
| 10,169,713 B2 | 1/2019 | Blanco et al. | |
| 10,796,238 B2 | 10/2020 | Chawla et al. | |
| 10,817,804 B1 | 10/2020 | Ozoka et al. | |
| 10,956,833 B1 * | 3/2021 | Yamane ................... | G06F 8/77 |

(Continued)

FOREIGN PATENT DOCUMENTS

CN 105260310 A 1/2016

OTHER PUBLICATIONS

"Adobe Captivate 3 User Guide," 2007, Adobe Systems Incorporated, p. 1-398. (Year: 2007).*

(Continued)

*Primary Examiner* — Qing Chen
(74) *Attorney, Agent, or Firm* — Shackelford, Mckinley & Norton, LLP; Robert A. Voigt, Jr.

(57) ABSTRACT

A computer-implemented method, system and computer program product for performing user acceptance testing. A virtual environment for virtual sponsor users to interact with a feature or a function of a software product is created. Such virtual sponsor users are virtual representations of actual or real sponsor users. Each of these virtual sponsor users are then assigned a persona type profile of a target audience. Such persona type profiles include the character traits of a user, such as a user or member of the target audience. Interactions of the virtual sponsor users with the feature or the function of the software product are then simulated and tracked. The rate of acceptance of the feature or the function of the software product is then determined based on such tracked interactions. In this manner, user acceptance testing is performed in a swiftly manner that is cost effective.

14 Claims, 6 Drawing Sheets

(56)                 References Cited

U.S. PATENT DOCUMENTS

| | | | |
|---|---|---|---|
| 11,520,692 B1 * | 12/2022 | Miller | G06F 11/3684 |
| 2004/0236456 A1 * | 11/2004 | Pieper | G06F 30/20 |
| | | | 700/132 |
| 2008/0162261 A1 * | 7/2008 | Velazquez | G06F 3/011 |
| | | | 715/757 |
| 2008/0163054 A1 | 7/2008 | Pieper et al. | |
| 2008/0263410 A1 * | 10/2008 | Mittal | G06F 11/3414 |
| | | | 714/47.2 |
| 2009/0235117 A1 * | 9/2009 | Mooney | G06F 11/3433 |
| | | | 714/25 |
| 2010/0162263 A1 * | 6/2010 | Kamalahasan | G06F 11/3414 |
| | | | 709/228 |
| 2011/0106610 A1 | 5/2011 | Landis et al. | |
| 2015/0135013 A1 * | 5/2015 | Thomas | G06Q 10/20 |
| | | | 714/27 |
| 2015/0356082 A1 | 12/2015 | Perdue | |
| 2015/0356408 A1 | 12/2015 | Faith et al. | |
| 2016/0189173 A1 | 6/2016 | King et al. | |
| 2016/0307129 A1 * | 10/2016 | Thomas | G06F 3/04842 |
| 2017/0177991 A1 | 6/2017 | Bogue et al. | |
| 2018/0150387 A1 * | 5/2018 | Kogan | G06F 8/38 |
| 2018/0247648 A1 * | 8/2018 | Nadimpalli | G10L 15/22 |
| 2018/0332072 A1 * | 11/2018 | Ford | H04L 63/1433 |
| 2019/0147366 A1 | 5/2019 | Sankaran et al. | |
| 2021/0081302 A1 * | 3/2021 | Reicher | G06F 11/302 |
| 2021/0304073 A1 * | 9/2021 | Li | G06N 20/00 |
| 2022/0413991 A1 * | 12/2022 | Kyle | G06F 11/3409 |

OTHER PUBLICATIONS

Ceelen, René, "What Is User Acceptance Testing (UAT) and Why Do We Need It?," <https://www.testmonitor.com/blog/what-is-user-acceptance-testing-uat-and-why-do-we-need-it>, Jul. 31, 2017, p. 1-10. (Year: 2017).*

* cited by examiner

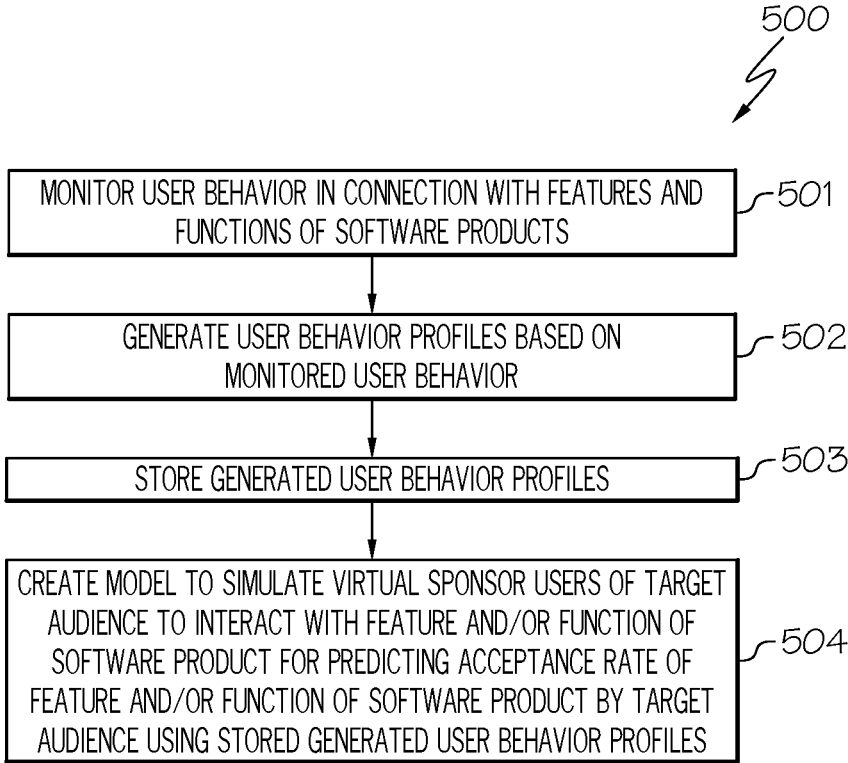

_500_

MONITOR USER BEHAVIOR IN CONNECTION WITH FEATURES AND FUNCTIONS OF SOFTWARE PRODUCTS _501_

GENERATE USER BEHAVIOR PROFILES BASED ON MONITORED USER BEHAVIOR _502_

STORE GENERATED USER BEHAVIOR PROFILES _503_

CREATE MODEL TO SIMULATE VIRTUAL SPONSOR USERS OF TARGET AUDIENCE TO INTERACT WITH FEATURE AND/OR FUNCTION OF SOFTWARE PRODUCT FOR PREDICTING ACCEPTANCE RATE OF FEATURE AND/OR FUNCTION OF SOFTWARE PRODUCT BY TARGET AUDIENCE USING STORED GENERATED USER BEHAVIOR PROFILES _504_

FIG. 5

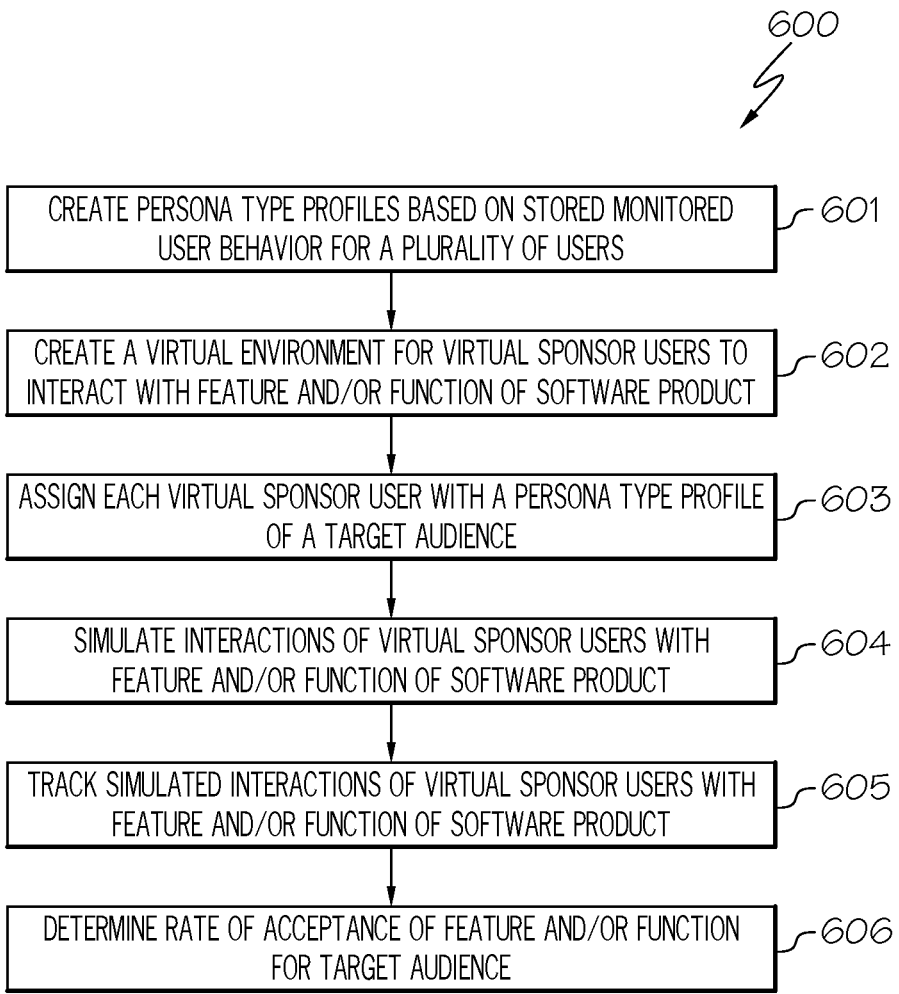

600

601 — CREATE PERSONA TYPE PROFILES BASED ON STORED MONITORED USER BEHAVIOR FOR A PLURALITY OF USERS

602 — CREATE A VIRTUAL ENVIRONMENT FOR VIRTUAL SPONSOR USERS TO INTERACT WITH FEATURE AND/OR FUNCTION OF SOFTWARE PRODUCT

603 — ASSIGN EACH VIRTUAL SPONSOR USER WITH A PERSONA TYPE PROFILE OF A TARGET AUDIENCE

604 — SIMULATE INTERACTIONS OF VIRTUAL SPONSOR USERS WITH FEATURE AND/OR FUNCTION OF SOFTWARE PRODUCT

605 — TRACK SIMULATED INTERACTIONS OF VIRTUAL SPONSOR USERS WITH FEATURE AND/OR FUNCTION OF SOFTWARE PRODUCT

606 — DETERMINE RATE OF ACCEPTANCE OF FEATURE AND/OR FUNCTION FOR TARGET AUDIENCE

FIG. 6

PREDICTING USER ACCEPTANCE OF FEATURES AND FUNCTIONS OF SOFTWARE PRODUCT

TECHNICAL FIELD

The present disclosure relates generally to user acceptance testing, and more particularly to predicting the acceptance of the features and functions of a software product by simulating virtual sponsor users interacting with the features and functions of the software product.

BACKGROUND

User acceptance testing is a formal testing of a software product with respect to user needs, requirements, and business processes conducted to determine whether the software product satisfies the acceptance criteria (e.g., requirements of a specification) and to enable the user, customers or other authorized entity to determine whether to accept the software product. User acceptance testing consists of a process of verifying that a user accepts the software product. It is not system testing (ensuring software does not crash and meets documented requirements) but rather ensures that the software product will work for the user (i.e., tests that the user accepts the software product).

SUMMARY

In one embodiment of the present disclosure, a computer-implemented method for performing user acceptance testing comprises creating a virtual environment for virtual sponsor users to interact with a feature or a function of a software product. The method further comprises assigning each of the virtual sponsor users with a persona type profile of a target audience. The method additionally comprises simulating interactions of the virtual sponsor users with the feature or the function of the software product. Furthermore, the method comprises tracking the interactions of the virtual sponsor users with the feature or the function of the software product. Additionally, the method comprises determining a rate of acceptance of the feature or the function for the target audience based on the tracked interactions.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 is a flowchart of a method for creating a model to simulate virtual sponsor users of a target audience to interact with a feature or function of a software product in accordance with an embodiment of the present disclosure; and FIG. 6 is a flowchart of a method for predicting an acceptance rate of the feature or function of the software product by the target audience in accordance with an embodiment of the present disclosure.

DETAILED DESCRIPTION

Figure 1:
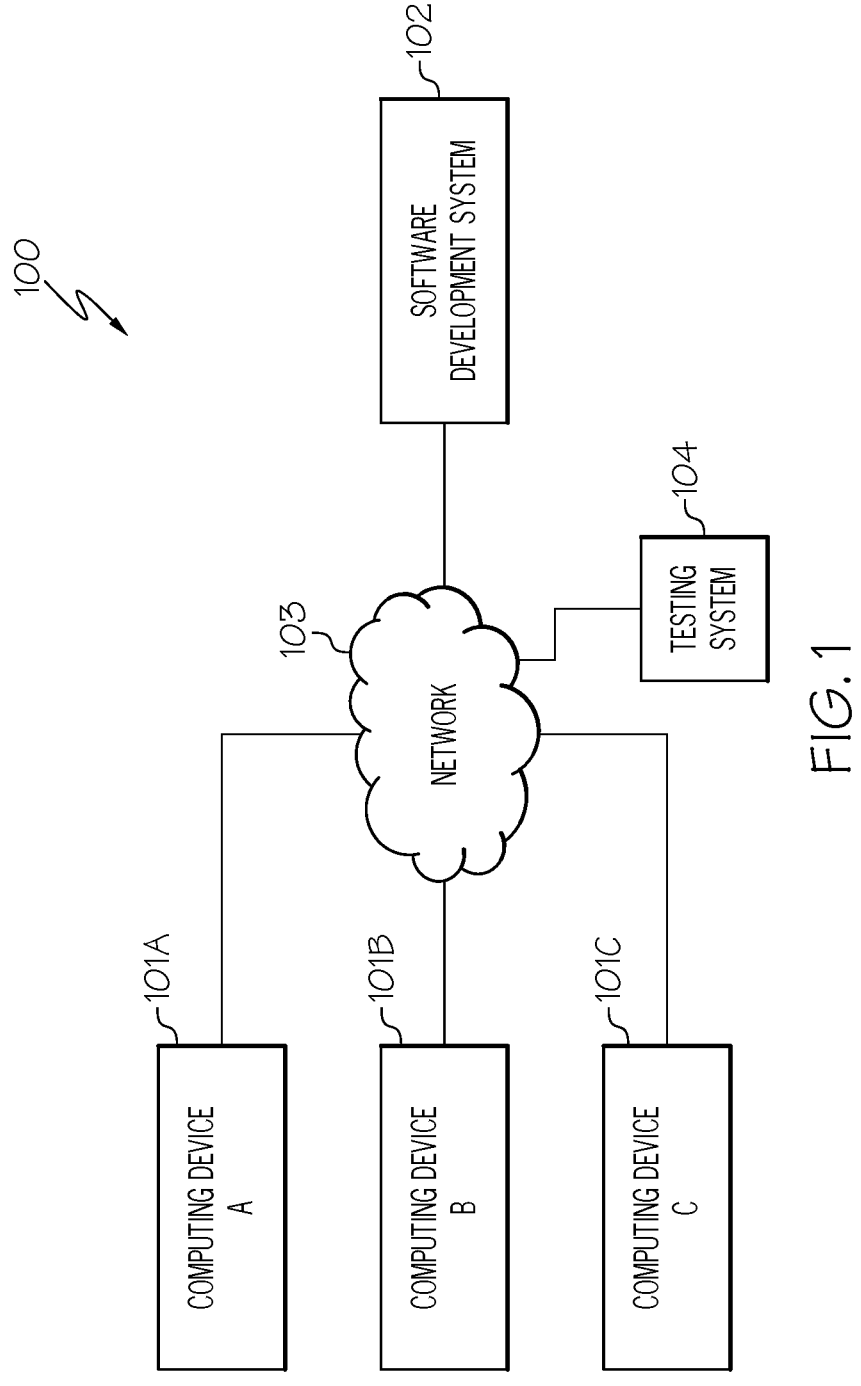
FIG. 1 illustrates a communication system for practicing the principles of the present disclosure in accordance with an embodiment of the present disclosure.

As stated in the Background section, user acceptance testing is a formal testing of a software product with respect to user needs, requirements, and business processes conducted to determine whether the software product satisfies the acceptance criteria (e.g., requirements of a specification) and to enable the user, customers or other authorized entity to determine whether to accept the software product. User acceptance testing consists of a process of verifying that a user accepts the software product. It is not system testing (ensuring software does not crash and meets documented requirements) but rather ensures that the software product will work for the user (i.e., tests that the user accepts the software product).

In particular, user acceptance testing is used to determine whether the user will accept modifications to the features or functions of the software product, such as a new functionality.

Such testing may be undertaken by a subject-matter expert (SME), preferably the owner or client of the software product under test, and provide a summary of the findings for confirmation to proceed after trial or review. Additionally, such testing may be undertaken by "sponsor users," which are real users or potential users that bring their experience and expertise to verify that the software product works for the user.

Unfortunately, software developers desire to release modifications to the software product, such as new features, quickly. As a result, it may not be possible to obtain enough sponsor users and/or subject-matter experts to perform user acceptance testing and provide feedback to determine the impact of the modification. Furthermore, even when sponsor users and/or subject-matter experts are available to provide early feedback, it is expensive and time consuming to work with these users to validate and ensure what is delivered will be well received and accepted.

Hence, there is not currently a means for effectively performing user acceptance testing in a swiftly manner that is cost-effective.

The embodiments of the present disclosure provide a means for performing user acceptance testing in a swiftly manner that is cost effective by simulating and tracking interactions of virtual sponsor users (as opposed to real sponsor users) with features and/or functions of the software product, where such virtual sponsor users are assigned a persona type profile of a target audience, thereby determining the rate of acceptance of the feature and/or function for the target audience.

In some embodiments of the present disclosure, the present disclosure comprises a computer-implemented method, system and computer program product for performing user acceptance testing. In one embodiment of the present disclosure, a virtual environment for virtual sponsor users to interact with a feature or a function of a software product is created. A "virtual environment," as used herein, refers to the virtual space in which the virtual sponsor user interacts with the feature or function of the software product. "Virtual sponsor users," as used herein, refer to the virtual representations of actual or real sponsor users. "Virtual representation," as used herein, refers to symbolizing a real sponsor user, such as via the use of a persona type profile. Each of the virtual sponsor users are then assigned a persona type profile of a target audience. A "persona type" profile, as used herein, refers to a profile that includes the character traits of a user, such as a user or member of the target audience. "Character traits," as used herein, refer to the personality or qualities of the user, such as emotions, tendencies, idiosyncrasies, curiosity, generosity, integrity, loyalty, devotion, kindness, sincerity, self-control, etc. Interactions of the virtual sponsor users with the feature or the function of the software product are then simulated and tracked. The rate of acceptance of the feature or the function of the software product is then determined based on such tracked interactions. In this manner, user acceptance testing is performed in a swiftly manner that is cost effective.

While the following discusses the present disclosure in connection with predicting the acceptance of the features and functions of a software product, the principles of the present disclosure may predict the acceptance of the features and functions of other products as well as services. A person of ordinary skill in the art would be capable of applying the principles of the present disclosure to such implementations. Further, embodiments applying the principles of the present disclosure to such implementations would fall within the scope of the present disclosure.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software developers, in the process of creating, designing, deploying and supporting software. Examples of such software development systems include, but not limited to, RAD Studio®, Embold®, Collaborator®, Studio 3T®, NetBeans®, Zend Studio®, Microsoft® Expression Studio, etc.

In one embodiment, software developers develop software products to be tested, such as via user acceptance testing, using software development system 102. As discussed above, traditionally, such software products are tested for user acceptance by "sponsor users," which are real users (e.g., users of computing devices 101) that bring their experience and expertise to verify that the software product works for the user. As will be discussed further below, such sponsor users will not be required to verify that the software product works for the user using the principles of the present disclosure.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a testing system 104 interconnected with software development system 102 via network 103. In one embodiment, testing system 104 is configured to perform user acceptance testing of a software product being developed by software developers using software development system 102.

User acceptance testing, as used herein, refers to a formal testing of a software product with respect to user needs, requirements, and business processes conducted to determine whether the software product satisfies the acceptance criteria (e.g., requirements of a specification) and to enable the user, customers or other authorized entity to determine whether to accept the software product. User acceptance testing consists of a process of verifying that a user accepts the software product. It is not system testing (ensuring software does not crash and meets documented requirements) but rather ensures that the software product will work for the user (i.e., tests that the user accepts the software product).

In particular, user acceptance testing is used to determine whether the user (e.g., user of computing device 101) will accept the features or functions (including modified features or functions or new features or functions) of the software product, such as a new functionality.

In one embodiment, testing system 104 performs user acceptance testing by creating a model for predicting the acceptance or rejection of the features and/or functions of a software product by a target audience. In one embodiment, the target audience is represented via virtual sponsor users associated with persona type profiles. A "virtual sponsor user," as used herein, refers to a virtual representation of an actual sponsor user. As previously discussed, sponsor users are real users or potential users that bring their experience and expertise to verify that the software product works for the user. However, it may not be possible to obtain enough sponsor users to perform such user performance testing. As a result, embodiments of the present disclosure utilize virtual representations of such sponsor users that are associated with persona type profiles (discussed further below).

Furthermore, in order to represent the target audience for the software product, such virtual sponsor users are associated with persona type profiles. The "target audience," as used herein, refers to the group of people at which the software product being developed is aimed. A "persona type" profile, as used herein, refers to a profile that includes the character traits of a user, such as a user or member of the target audience. "Character traits," as used herein, refer to the personality or qualities of the user, such as emotions, tendencies, idiosyncrasies, curiosity, generosity, integrity, loyalty, devotion, kindness, sincerity, self-control, etc.

In one embodiment, the particular persona type profiles that are assigned to virtual sponsor users are determined by an expert in evaluating potential target audiences for software products. That is, the persona type profiles are selected by an expert to represent the character traits of the target audience.

A description of the software components of testing system 104 used to perform user acceptance testing of a software product developed by software developers using software development system 102 is provided below in connection with FIG. 2. A description of the hardware configuration of testing system 104 is provided further below in connection with FIG. 4.

System 100 is not to be limited in scope to any one particular network architecture. System 100 may include any number of computing devices 101, software development systems 102, networks 103 and testing systems 104.

A discussion regarding the software components used by testing system 104 to perform user acceptance testing of a software product is discussed below in connection with FIG. 2.

Figure 2:
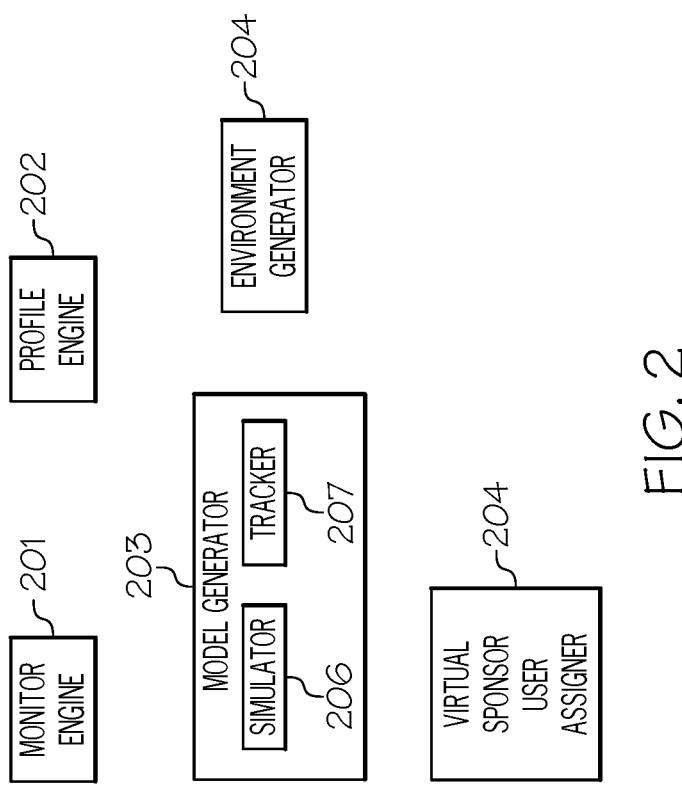
FIG. 2 is a diagram of the software components used by the testing system to perform user acceptance testing in accordance with an embodiment of the present disclosure.

FIG. 2 is a diagram of the software components used by testing system 104 (FIG. 1) to perform user acceptance testing in accordance with an embodiment of the present disclosure.

Referring to FIG. 2, in conjunction with FIG. 1, testing system 104 includes a monitor engine 201 configured to monitor user behavior in connection with the features and functions of a software product, including modifications to existing features and functions or establishment of new features and functions. "User behavior," or "behavior characteristics," as used herein, refers to the manner of behaving or conducting oneself, such as in connection with the features and functions of a software product. Examples of such behavior characteristics include, but not limited to, frustration, laid back, happy, irritable, positive, negative, etc.

In one embodiment, monitor engine 201 utilizes user behavior analytics in connection with monitoring such user behavior. "User behavior analytics," as used herein, refers to collecting, combining and analyzing quantitative and qualitative user data to understand the user's manner of behaving or conducting oneself in connection with interacting with the features and functions of the software product.

In one embodiment, such user data may be collected by monitor engine 201 via session recordings, which are renderings of real user engagement, such as clicks, taps and scrolling, which can be reviewed by an expert to learn the user's behavior characteristics (e.g., frustration is exemplified by a sudden increase in the number of clicks or taps) in connection with interacting with different features and functions of the software products. In one embodiment, session recording occurs by installing an application, such as on computing device 101, to record the computer screen when the user (e.g., user of computing device 101) is interacting with the features and functions of the software product. Such a session recording is then sent to monitor engine 201 of testing system 104. In one embodiment, the session recording is analyzed by an expert to identify the user's behavior characteristics in connection with the features and functions of the software product.

In one embodiment, heat maps may be utilized by monitor engine 201 to see where the user (e.g., user of computing device 101) spends the most time in interacting with a software product, such as a new feature or function of the software product. For example, the heat map may indicate that a user spends a significant amount of time interacting with a new feature or function, which may indicate a positive behavior characteristic.

In another embodiment, surveys, such as onsite surveys, may be utilized by monitor engine 201 to collect personal responses from users as to what features or functions of the software product are working for them and which are not. In one embodiment, such responses include the user's behavior characteristics.

In one embodiment, monitor engine 201 utilizes feedback widgets to obtain feedback regarding particular features or functions of the software product. In one embodiment, feedback widgets are installed on computing device 101 to enable the user of computing device 101 to provide feedback regarding the features and functions of the software product. In one embodiment, such feedback includes the user's behavior characteristics in connection with the features and functions of the software product. Such feedback is then provided to monitor engine 201.

Examples of software tools utilized by monitor engine 201 to obtain such user behavior analytics include, but not limited to, Mixpanel™, Amplitude®, Heap®, FullStory®, Sherlock, Tableau®, etc.

In one embodiment, such user behavior monitored by monitor engine 201 includes information regarding the time for providing feedback ("feedback time") and the time for the user to accept the feature or function ("user acceptance time"). For example, "feedback time," as used herein, refers to the amount of time for the user (e.g., user of computing device 101) to provide feedback after interacting with the feature or function of the software product. For instance, such a time may be determined based on when the user provides feedback via the feedback widget after such a widget appears to the user via the user interface of computing device 101.

"User acceptance time," as used herein, refers to the amount of time for the user (e.g., user of computing device 101) to accept or approve the feature or function of the software product. For example, such a time may be determined by monitor engine 201 as corresponding to the time duration from when the user starts interacting with the feature or function of the software product until the time the user indicates an acceptance or approval of such a feature or function. As discussed above, such acceptance or approval may be learned from surveys, feedback, an expert analysis of a session recording, etc.

Testing system 104 further includes a profile engine 202 configured to generate user behavior profiles based on the monitored user behavior in connection with the features and/or functions of the software product. In one embodiment, the information collected by monitor engine 201 discussed above is contained within such a user behavior profile.

A "user behavior" profile, as used herein, refers to a profile that includes behavior characteristics of users. As discussed above, "behavior characteristics," as used herein, refers to the manner of behaving or conducting oneself.

In one embodiment, such user behavior profiles are generated for users (e.g., users of computing devices 101), such as users utilizing a particular software product. In one embodiment, such user behavior profiles are generated by profile engine 202 using an approach called "evolving agent behavior classification based on distributions of relevant events (EVABCD)."

In one embodiment, profile engine 202 generates such user behavior profiles via online surveys filled out by the users (e.g., users of computing devices 101) in connection with the features and/or functions of the software product. In one embodiment, profile engine 202 utilizes online survey software and questionnaire tools to obtain behavior characteristics of users, such as Typeform®, Feedier®, HubSpot®, SurveyMonkey®, Crowdsignal®, etc.

In one embodiment, such generated user behavior profiles are generated for the purpose of determining the different types of behavior characteristics among a target audience of a software product. As a result, such behavior characteristics may be directed to users of a particular software product.

In one embodiment, such generated user behavior profiles are generated for the purpose of determining the acceptance rate of the features and/or functions of the software product. "Acceptance rate," as used herein, refers to the rate (percentage) at which the particular feature or function of the software product is deemed to be adequate or suitable to the user. For example, if ten users were monitored for their behavior in connection with feature A, and six of those users were deemed to accept such a feature to be adequate or suitable to them and four of those users deemed such a feature to not be adequate or suitable, then the acceptance rate is $\frac{6}{10}$ (60%). In one embodiment, acceptance is determined based on user behavior analytics discussed above. For example, such user behavior analytics may include information, such as user provided feedback regarding the feature or function. For instance, the user may indicate that he/she was impressed by the feature or function. In another example, the user may indicate that he/she was dissatisfied with the feature or function. In one embodiment, profile engine 202 utilizes natural language processing to identify keywords that signify acceptance or rejection of the feature or function of the software product, where such keywords (e.g., dislike, enjoyed) are listed in a data structure (e.g., table). In one embodiment, such a data structure is stored in a storage device of testing system 104 (e.g., memory, disk drive).

In connection with storing the acceptance rate of the features and/or functions of the software product in the user behavior profiles, such features and/or functions may be categorized (e.g., user interface objects, language, transcription, input) in the user behavior profiles. Such categorization may be determined by an expert or by profile engine 202 via a data structure (e.g., table) storing a listing of features and functions as well as the associated category. In one embodiment, such a data structure is stored in a storage device of testing system 104 (e.g., memory, disk drive).

By having such features and/or functions classified in the user behavior profiles, the acceptance rate for particular categories of features and/or functions may be determined based on the user behavior (behavior characteristics). Such information will later be used to generate the behavioral model score (discussed further below) representing the acceptance rating for a type of persona for a given category of a feature or function of the software product that includes the feature or function of the software product for which the rate of acceptance is to be determined (i.e., the feature or function of the software product for which user acceptance testing is to be performed).

In one embodiment, such generated user behavior profiles are generated for the purpose of determining the time frame needed for testing, which may be based on the feedback time and the user acceptance time.

Testing system 104 further includes a model generator 203 configured to create a model for predicting the acceptance rate of the target audience of a feature and/or function of a software product using the user behavior profiles.

In one embodiment, model generator 203 uses a machine learning algorithm (e.g., supervised learning) to build a mathematical model based on sample data consisting of user behavior in connection with features and functions of software products. Such data may be obtained from the user behavior profiles. Such a data set is referred to herein as the "training data" which is used by the machine learning algorithm to make predictions or decisions without being explicitly programmed to perform the task. In one embodiment, the training data consists of user behavior in connection with features and functions of software products. The algorithm iteratively makes predictions on the training data as to the acceptance rate of a feature or function of a software product for a target audience. A "target audience," as used herein, refers to the group of people at which the software product being developed is aimed. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the acceptance rate of a feature or function of a software product for a target audience.

In one embodiment, model generator 203 creates such a model using the algorithm discussed below:

$$Y=(z(P(?))\times VTT\times FCA), \qquad \text{EQ (1)}$$

$$z(P(?))=z1(PBM1\times PW1)+(z2(PBM2\times PW2) \qquad \text{EQ (2)}$$

where Y is equal to the predicted acceptance rate of a feature or function of a software product for a target audience, z(P(?)) corresponds to the number of personas used in the user acceptance testing and their persona type, VTT corresponds to a time duration, and FCA corresponds to the historical feature class acceptance rate.

Personas, as used herein, refer to the aspect of a user's character. In one embodiment, such a user refers to a virtual sponsor user, which is a virtual representation of an actual sponsor user. In one embodiment, the number of personas corresponds to the number of virtual sponsor users.

A "persona type," as used herein, refers to the behavior characteristics discussed above, such as frustration, laid back, happy, irritable, positive, negative, etc.

As discussed above, VTT corresponds to a time duration (e.g., hours). In one embodiment, such a time duration is comprised of a feedback time and a user acceptance time. For example, in one embodiment, VTT is equal to the feedback time plus the user acceptance time. As discussed above, "feedback time," as used herein, refers to the amount of time for the user (e.g., user of computing device 101) to provide feedback after interacting with the feature or function of the software product. "User acceptance time," as used herein, refers to the amount of time for the user (e.g., user of computing device 101) to accept or approve of the feature or function of the software product.

Furthermore, as discussed above, FCA refers to the historical feature class acceptance rate. In one embodiment, the acceptance rate of a target audience regarding a feature or function of a software product is determined based on the user behavior monitored by monitor engine 201. In one embodiment, such information is stored in the user behavior profile, which may correspond to a user behavior profile for a target audience determined by an expert. For example, an expert may identify ten users (e.g., users of computing device 101) as corresponding to a target audience for a particular feature or function of a software product (e.g., supporting LaTeX syntax, adjusting text spacing, column width and page color, customizable, portable set of pens to write in a document, etc.). Based on the user behavior of such users, the acceptance rate for such a feature or function (e.g., supporting LaTeX syntax) is then computed based on identifying the number of users out of this target class of user (e.g., ten users) that accept or approve such a feature/function. As previously discussed, there are many ways to determine acceptance or approval ranging from surveys, feedback, an expert analysis of a session recording, etc. Such an acceptance rate may be stored in the user behavior profile for the target audience, which corresponds to the FCA for that particular feature or function. In one embodiment, the FCA may be utilized in the above algorithm to compute the acceptance rate for an alternative feature or function of a software product where such a feature or function is similar to the feature or function for which the FCA was computed, such as being in the same category or classification. For example, if the FCA was computed for the feature of adjusted text spacing, it may be categorized as "character spacing." As a result, such an FCA may be utilized in determining the acceptance rate for a target audience for the feature of adjusted column width since both features are categorized in the same category as "character spacing." As discussed above, such categorization may be determined by an expert or via a data structure (e.g., table) storing a listing of features and functions as well as the associated category. In one embodiment, such a data structure is stored in a storage device of testing system 104 (e.g., memory, disk drive). In one embodiment, the value of FCA corresponds to a percentage. In one embodiment, the FCA score is normalized between the values of 0 and 1. In one embodiment, the higher the score the greater the historical feature class acceptance rate.

Furthermore, as discussed above, $z(P(?))=z1(PBM1 \times PW1)+z2(PBM2 \times PW2)$. "PBM," as used herein, refers to the persona behavioral model score. In one embodiment, the PBM represents the acceptance rating of a type of persona (represented by "z," such as "z1" for a first particular type of persona, "z2" for a second particular type of persona and so forth) given the feature specification as input. For example, for the persona type of laid back, it may have been historically observed by monitor engine 201 that such behavior characteristics result in an acceptance rate that averages 80% for a particular category (e.g., user interface objects) of the features and functions of a software product, including the category of the feature or function of the software product in question (i.e., the feature or function of the software product for which user acceptance testing is to be performed). Hence, for such a persona type, the PBM corresponds to the score of 0.8, which corresponds to a percentage of 80% (acceptance rate). In one embodiment, the PBM score is dynamically generated based on the continual monitoring of the acceptance rates of particular features and functions for users with a particular behavior characteristic. In one embodiment, the PBM score is normalized between the values of 0 and 1. In one embodiment, the higher the score the greater the acceptance rate.

"PW," as used herein, refers to persona weight. In one embodiment, such a weight corresponds to the percentage of the target audience that is assumed to contain such a persona type. For example, an expert may determine that the target audience is comprised of 40% of users with a persona type of laid back. As a result, PW may correspond to the value of 0.4, representing the percentage of 40%. In one embodiment, the value of PW is normalized between the values of 0 and 1. In one embodiment, the higher the score the greater the percentage of the users of the target audience with that persona type.

Furthermore, as discussed above, the parameter "z" in the above equation represents the type of persona (e.g., happy). As further illustrated in the above equation, $z(P(?))$ is computed based on two types of personas represented by z1 and z2. The persona of z1 has a personal behavioral model score represented by PBM1 and a persona weight represented by PW1. Furthermore, the persona of z2 has a personal behavioral model score represented by PBM2 and a persona weight represented by PW2. While the foregoing algorithm contains two types of personas, it is noted that $z(P(?))$ may be calculated based on any number of persona types, such as the number of persona types of the users of the target audience, which may be determined by an expert.

An example of utilizing the above algorithm (EQ (1) and EQ (2)) to predict the acceptance rate of a feature or function of a software product for a target audience is discussed below in connection with FIG. 3.

Figure 3:
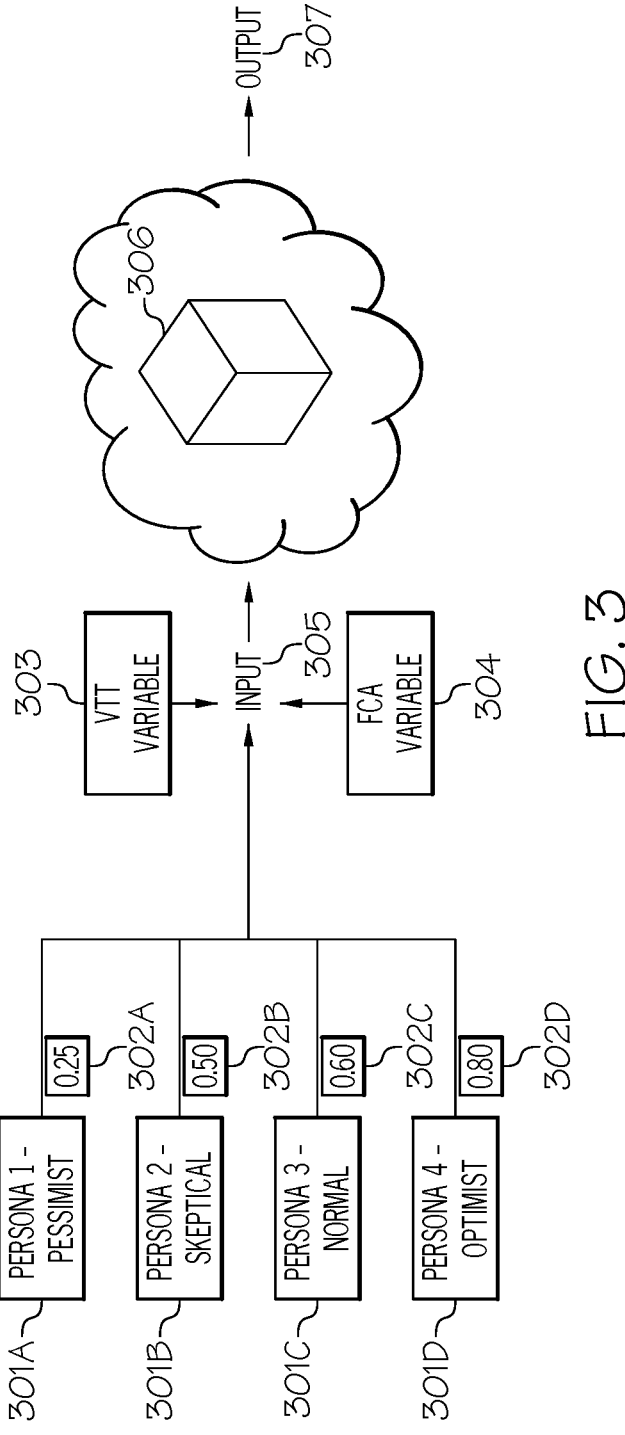
FIG. 3 illustrates an example of predicting the acceptance rate of a feature or function of a software product for a target audience in accordance with an embodiment of the present disclosure.

Referring to FIG. 3, FIG. 3 illustrates an example of predicting the acceptance rate of a feature or function of a software product for a target audience using the algorithm represented by EQ (1) and EQ (2) in accordance with an embodiment of the present disclosure.

As shown in FIG. 3, four different persona type profiles 301A-301D (identified as "Persona 1—pessimist," "Persona 2—skeptical," "Persona 3—normal," and "Persona 4—optimist," respectively) are utilized to predict the acceptance rate of a feature or function of a software product for a target audience. Personas 301A-301D are collectively or individually referred to as personas 301 or persona 301, respectively. While FIG. 3 illustrates using four different persona type profiles 301, any number of persona type profiles 301 may be utilized to predict the acceptance rate of a feature or function of a software product for a target audience.

As shown in FIG. 3, the target audience is classified into four virtual sponsor users, each associated with a different persona type profile. Each persona type is weighted by a weight ("PW") that corresponds to the percentage of the target audience that is assumed to contain such a persona type. For example, persona 301A ("pessimist") has a weight of 0.25 (element 302A), persona 301B ("skeptical") has a weight of 0.50 (element 302B), persona 301C ("normal") has a weight of 0.60 (element 302C), and persona 301D ("optimist") has a weight of 0.8 (element 302D). Such inputs are used in conjunction with the VTT variable 303 and FCA variable 304 to form the input 305 to the model 306 (model generated by model generator 203) to generate an output 307 corresponding to the predicted acceptance rate of a feature or function of a software product for a target audience.

Referring to equations EQ(1) and EQ(2) in connection with the above-example, $Y=(z1(PBM1\times PW1)++z2(PBM2\times PW2)+z3(PBM3\times PW3)+z4(PBM4\times PW4))\times VTT\times FCA)$.

As shown in FIG. 3, z1 is represented by persona 1 301A, z2 is represented by persona 2 301B, etc. As a result, $Y=((PBM1\times 0.25)+(PBM2\times 0.50)+(PBM3\times 0.60)+(PBM4\times 0.8))\times VTT\times FCA$. If PBM1=0.3, PBM2=0.4, PBM3=0.5, PBM4=0.6, VTT=2 (representing a total of 2 hours) and FCA=0.33, then Y=0.6963, which represents a 69.63% acceptance rate.

Referring again to FIG. 2, in additional to generating user behavior profiles, profile engine 202 is configured to create persona type profiles based on such stored user behavior profiles containing information pertaining to the user behavior monitored by monitor engine 201. "Persona type" profiles, as used herein, refer to profiles directed to certain persona types, such as the behavior characteristics discussed above, such as frustration, laid back, happy, irritable, positive, negative, etc. As a result, such persona type profiles include information, such as the user acceptance rate for that type of persona (e.g., happy) for particular categories of features and functions of software products. In one embodiment, persona type profiles are assigned to the virtual sponsor user that represents a "real" sponsor user with such a persona type. If the target audience is deemed to contain 40% of users with such a persona type, such as by an expert, then a weight of 0.40, represented by PW in the above-equation, may be utilized to determine the acceptance rate of the target audience for a particular feature or function of the software product.

In one embodiment, user behavior profiles include behavior characteristics for each user monitored, including their acceptance or rejection of categorized features and functions of software products. After analyzing such user behavior profiles, profile engine 202 determines the overall class acceptance rate for a particular category of a feature or function of a software product for a particular behavior characteristic or type of persona. For example, user behavior profiles A, C, E, F and G may include information pertaining to those users with a behavior characteristic of being positive in connection with interacting with a feature classified as a user interface object. Based on analyzing such user behavior profiles, profile engine 202 determines the percentage of those users with such a behavior characteristic in accepting such a categorized feature. Such information is then inputted into the persona type profile for such a behavior characteristic (e.g., positive) in connection with such a categorized feature (e.g., user interface object).

Furthermore, as shown in FIG. 2, testing system 104 includes environment generator 204 configured to create a virtual environment for virtual sponsor users to interact with the feature and/or function of the software product. A "virtual environment," as used herein, refers to the virtual space in which the virtual sponsor user interacts with the feature or function of the software product. For example, suppose that testing system 104 is to determine the acceptance rate of the function of using a customizable, portable set of pens, pencils and highlighters to write in a document for the target audience. Environment generator 204 may then generate a pull-down menu on the user interface containing a pencil, pen and highlighter from which the virtual user is to select. In one embodiment, environment generator 204 utilizes software tools to create such a virtual environment, such as Virtualenv, Pipenv, Conda®, In one embodiment, environment generator 204 generates a virtual environment via the use of packages, modules and directories, in which the virtual environment is provided access to certain packages, modules and directories as indicated by an expert, such as those containing software code for generating software objects on a user interface. In one embodiment, a package, module or directory is created, such as by an expert, to generate the feature or function of the software product (for which user acceptance testing is to be performed) to appear in the user interface. The virtual environment is then provided access to such a package, module or directory by environment generator 204.

In one embodiment, the feature or function of the software product, for which user acceptance testing is to be performed, is provided to environment generator 204 by an expert. In one embodiment, code to generate such a feature or function is provided to environment generator 204 by an expert. In one embodiment, code to generate such a feature or function is automatically generated via the use of symbolic expressions (e.g., SymPy symbolic expressions) representing the feature or function for which acceptance testing is to be performed, such as via the use of a software tool of SymPy.

Referring again to FIG. 2, testing system 104 includes a virtual sponsor user assigner 205 configured to assign virtual sponsor users with a persona type profile of a target audience. As discussed above, a virtual sponsor user refers to a virtual representation of an actual sponsor user. "Virtual representation," as used herein, refers to symbolizing a real sponsor user via the use of a persona type profile. For example, instead of utilizing an actual sponsor user (e.g., user of computing device 101A) to perform user acceptance testing, such a sponsor user is represented by a virtual sponsor user associated with a persona type profile that characterizes the persona or behavior characteristic of that sponsor user.

In one embodiment, the number of virtual sponsor users used by testing system 104 corresponds to the number of persona type profiles that are used to represent the different personas or behavior characteristics of the target audience, such as determined by the expert. For example, if the target audience is deemed to contain the six persona types of frustration, laid back, happy, irritable, positive and negative, then six virtual sponsor users will be used by testing system 104 to represent the actual or real sponsor users. Such virtual sponsor users will then be assigned the appropriate six persona type profiles by virtual sponsor user assigner 205.

Furthermore, as illustrated in FIG. 2, model generator 203 includes a simulator 206 and a tracker 207. Simulator 206 is configured to simulate the interactions of the virtual sponsor users with the feature and/or function of the software product. Tracker 207 is configured to track such simulated interactions of the virtual sponsor users with the feature and/or function of the software product.

In one embodiment, simulator 206 utilizes the automated usability evaluation (AUE) process to simulate the interactions of the virtual sponsor users with the feature and/or function of the software product. In one embodiment, execution times and completion rates of the features and/or functions of the software product are carried out with the AUE process using GOMS based methods.

In one embodiment, simulator 206 uses a mathematical description of the software product, which is composed of equations that duplicate the functional relationships within the software product, including the feature and/or function of the software product for which user acceptance testing is to be performed. In one embodiment, such a mathematical description is provided by an expert. In one embodiment, simulator 206 simulates the interactions of such features and/or functions of the software product using persona type profiles associated with virtual sponsor users. For example, such persona type profiles may indicate that certain types of features or functions are more commonly accepted by users with a certain persona or behavior characteristic. For instance, features or functions concerning syntax may be more commonly accepted by users with a persona type of being happy or laid back as opposed to a persona type of being irritable. As a result, in simulating a software product with a feature of now supporting LaTeX syntax, simulator 206 takes into consideration such persona type profiles in simulating interactions with such a feature by different virtual sponsor users associated with different persona type profiles.

In one embodiment, an expert provides to simulator 206 the steps, location, theme, color scheme, etc. of the feature or function (for which user acceptance testing is to be performed) to be simulated by simulator 206. Such steps, location, theme, color scheme, etc. of the feature or function of the software product are used to simulate the interactions of the virtual sponsor users to the feature or function (for which user acceptance testing is to be performed) using the associated persona type profiles.

In one embodiment, simulator 206 utilizes the SIMU-LIA® simulation tool by Dassault Systemes. In another embodiment, simulator 206 utilizes software tools, such as OpenModelica, CoCoVila, Adobe® Captivate, Atomi ActivePresenter®, ITyStudio, Uptale®, etc. to simulate the interactions of the virtual sponsor users with the feature and/or function of the software product.

In one embodiment, in connection with the simulation performed by simulator 206, interactions are added and actions to each such interactions are assigned based on the persona type profiles assigned to the virtual sponsor users. For example, features or functions concerning syntax may be more commonly accepted by users with a persona type of being happy or laid back as opposed to a persona type of being irritable. As a result, a persona type profile may indicate an action of scrolling to a different screen upon being presented an option using LaTeX syntax for a user with a persona type of being irritable; whereas, the persona type profile may indicate an action of clicking on an icon representing the option of using LaTeX syntax upon being presented an option of using the LaTeX syntax for a user with a persona type of being laid back. In one embodiment, such interactions are identified and learned from the created model and inputted into the persona type profile by profile engine 202.

Tracker 207 tracks such simulated interactions of the virtual sponsor users with the feature and/or function of the software product for which user acceptance testing is to be performed. In one embodiment, tracker 207 utilizes software tools, such as OpenModelica, CoCoVila, Adobe® Captivate, Atomi ActivePresenter®, ITyStudio, Uptale®, etc. to track the simulated interactions of the virtual sponsor users with the feature and/or function of the software product for which user acceptance testing is to be performed.

A further description of these and other functions is provided below in connection with the discussion of the method for performing user acceptance testing.

Prior to the discussion of the method for performing user acceptance testing, a description of the hardware configuration of testing system 104 (FIG. 1) is provided below in connection with FIG. 4.

Figure 4:
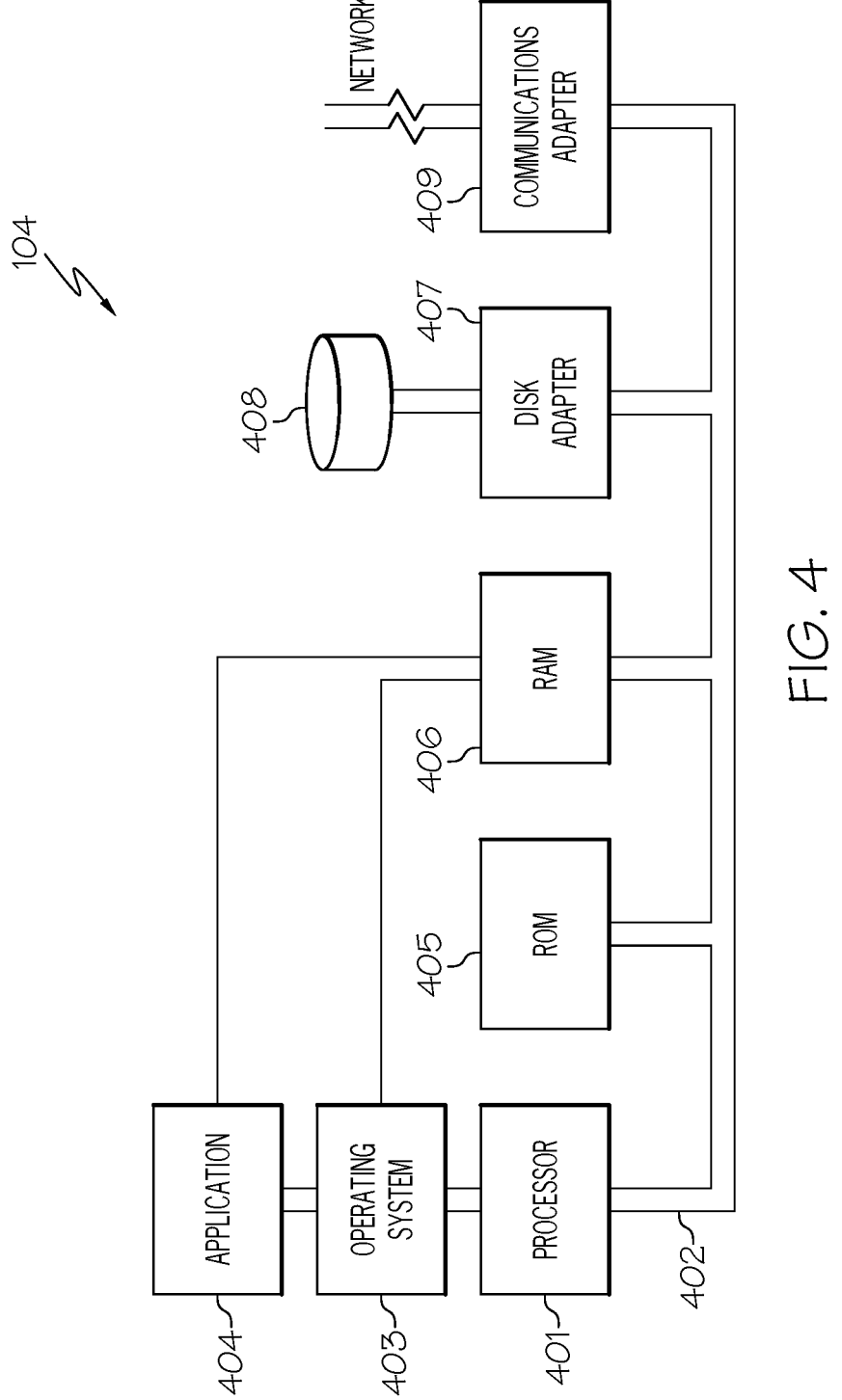
FIG. 4 illustrates an embodiment of the present disclosure of the hardware configuration of the testing system which is representative of a hardware environment for practicing the present disclosure.

Referring now to FIG. 4, FIG. 4 illustrates an embodiment of the present disclosure of the hardware configuration of testing system 104 (FIG. 1) which is representative of a hardware environment for practicing the present disclosure.

Testing system 104 has a processor 401 connected to various other components by system bus 402. An operating system 403 runs on processor 401 and provides control and coordinates the functions of the various components of FIG. 4. An application 404 in accordance with the principles of the present disclosure runs in conjunction with operating system 403 and provides calls to operating system 403 where the calls implement the various functions or services to be performed by application 404. Application 404 may include, for example, monitor engine 201 (FIG. 2), profile engine 202 (FIG. 2), model generator 203 (FIG. 2), environment generator 204 (FIG. 2), virtual sponsor user assigner 205 (FIG. 2), simulator 206 (FIG. 2) and tracker 207 (FIG. 2). Furthermore, application 404 may include, for example, a program for performing user acceptance testing as discussed further below in connection with FIGS. 5-6.

Referring again to FIG. 4, read-only memory ("ROM") 405 is connected to system bus 402 and includes a basic input/output system ("BIOS") that controls certain basic functions of testing system 104. Random access memory ("RAM") 406 and disk adapter 407 are also connected to system bus 402. It should be noted that software components including operating system 403 and application 404 may be loaded into RAM 406, which may be testing system's 104 main memory for execution. Disk adapter 407 may be an integrated drive electronics ("IDE") adapter that communicates with a disk unit 408, e.g., disk drive. It is noted that the program for performing user acceptance testing, as discussed further below in connection with FIGS. 5-6, may reside in disk unit 408 or in application 404.

Testing system 104 may further include a communications adapter 409 connected to bus 402. Communications adapter 409 interconnects bus 402 with an outside network (e.g., network 103 of FIG. 1) to communicate with other devices, such as computing devices 101 of FIG. 1.

In one embodiment, application 404 of testing system 104 includes the software components of monitor engine 201, profile engine 202, model generator 203, environment generator 204, virtual sponsor user assigner 205, simulator 206 and tracker 207. In one embodiment, such components may be implemented in hardware, where such hardware components would be connected to bus 402. The functions discussed above performed by such components are not generic computer functions. As a result, testing system 104 is a particular machine that is the result of implementing specific, non-generic computer functions.

In one embodiment, the functionality of such software components (e.g., monitor engine 201, profile engine 202, model generator 203, environment generator 204, virtual sponsor user assigner 205, simulator 206 and tracker 207) of testing system 104, including the functionality for performing user acceptance testing, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, con-figuration data for integrated circuitry, or either source code or object code written in any combination of one or more programming languages, including an object oriented pro-gramming language such as Smalltalk, C++, or the like, and procedural programming languages, such as the "C" pro-gramming language or similar programming languages. The computer readable program instructions may execute entirely on the user's computer, partly on the user's com-puter, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod-ucts according to embodiments of the invention. It will be understood that each block of the flowchart illustrations and/or block diagrams, and combinations of blocks in the flowchart illustrations and/or block diagrams, can be imple-mented by computer readable program instructions.

These computer readable program instructions may be provided to a processor of a computer, or other program-mable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing apparatus, or other device to cause a series of operational steps to be performed on the computer, other programmable apparatus or other device to produce a computer imple-mented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be accomplished as one step, executed concurrently, substantially concurrently, in a par-tially or wholly temporally overlapping manner, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

As stated above, user acceptance testing is a formal testing of a software product with respect to user needs, requirements, and business processes conducted to deter-mine whether the software product satisfies the acceptance criteria (e.g., requirements of a specification) and to enable the user, customers or other authorized entity to determine whether to accept the software product. User acceptance testing consists of a process of verifying that a user accepts the software product. It is not system testing (ensuring software does not crash and meets documented require-ments) but rather ensures that the software product will work for the user (i.e., tests that the user accepts the software product). In particular, user acceptance testing is used to determine whether the user will accept modifications to the features or functions of the software product, such as a new functionality. Such testing may be undertaken by a subject-matter expert (SME), preferably the owner or client of the software product under test, and provide a summary of the findings for confirmation to proceed after trial or review. Additionally, such testing may be undertaken by "sponsor users," which are real users or potential users that bring their experience and expertise to verify that the software product works for the user. Unfortunately, software developers desire to release modifications to the software product, such as new features, quickly. As a result, it may not be possible to obtain enough sponsor users and/or subject-matter experts to perform user acceptance testing and provide feedback to determine the impact of the modification. Furthermore, even when sponsor users and/or subject-matter experts are available to provide early feedback, it is expensive and time consuming to work with these users to validate and ensure what is delivered will be well received and accepted. Hence, there is not currently a means for effectively performing user acceptance testing in a swiftly manner that is cost-effective.

The embodiments of the present disclosure provide a means for performing user acceptance testing in a swiftly manner that is cost effective by simulating and tracking interactions of virtual sponsor users (as opposed to real sponsor users) with the features and/or functions of the software product, where such virtual sponsor users are assigned a persona type profile of a target audience, thereby determining the rate of acceptance of the feature and/or function by the target audience as discussed below in connection with FIGS. 5 and 6. FIG. 5 is a flowchart of a method for creating a model to simulate virtual sponsor users of a target audience to interact with a feature or function of a software product. FIG. 6 is a flowchart of a method for predicting an acceptance rate of the feature or function of the software product by the target audience.

As stated above, FIG. 5 is a flowchart of a method 500 for creating a model to simulate virtual sponsor users of a target audience to interact with a feature or function of a software product in accordance with an embodiment of the present disclosure.

Referring to FIG. 5, in conjunction with FIGS. 1-4, in step 501, monitor engine 201 of testing system 104 monitors user behavior in connection with the features and functions of software products.

As discussed above, "user behavior," or "behavior characteristics," as used herein, refers to the manner of behaving or conducting oneself, such as in connection with the features and functions of a software product. Examples of such behavior characteristics include, but not limited to, frustration, laid back, happy, irritable, positive, negative, etc.

In one embodiment, monitor engine 201 utilizes user behavior analytics in connection with monitoring such user behavior. "User behavior analytics," as used herein, refers to collecting, combining and analyzing quantitative and qualitative user data to understand the user's manner of behaving or conducting oneself in connection with interacting with the features and functions of the software product.

In one embodiment, such user data may be collected by monitor engine 201 via session recordings, which are renderings of real user engagement, such as clicks, taps and scrolling, which can be reviewed by an expert to learn the user's behavior characteristics (e.g., frustration is exemplified by a sudden increase in the number of clicks or taps) in connection with interacting with different features and functions of the software products. In one embodiment, session recording occurs by installing an application, such as on computing device 101, to record the computer screen when the user (e.g., user of computing device 101) is interacting with the features and functions of the software product. Such a session recording is then sent to monitor engine 201 of testing system 104. In one embodiment, the session recording is analyzed by an expert to identify the user's behavior characteristics in connection with the features and functions of the software product.

In one embodiment, heat maps may be utilized by monitor engine 201 to see where the user (e.g., user of computing device 101) spends the most time in interacting with a software product, such as a new feature or function of the software product. For example, the heat map may indicate that a user spends a significant amount of time interacting with a new feature or function, which may indicate a positive behavior characteristic.

In another embodiment, surveys, such as onsite surveys, may be utilized by monitor engine 201 to collect personal responses from users as to what features or functions of the software product are working for them and which are not. In one embodiment, such responses include the user's behavior characteristics.

In one embodiment, monitor engine 201 utilizes feedback widgets to obtain feedback regarding particular features or functions of the software product. In one embodiment, feedback widgets are installed on computing device 101 to enable the user of computing device 101 to provide feedback regarding the features and functions of the software product. In one embodiment, such feedback includes the user's behavior characteristics in connection with the features and functions of the software product. Such feedback is then provided to monitor engine 201.

Examples of software tools utilized by monitor engine 201 to obtain such user behavior analytics include, but not limited to, Mixpanel™, Amplitude®, Heap®, FullStory®, Sherlock, Tableau®, etc.

In one embodiment, such user behavior monitored by monitor engine 201 includes information regarding the time for providing feedback ("feedback time") and the time for the user to accept the feature or function ("user acceptance time"). For example, "feedback time," as used herein, refers to the amount of time for the user (e.g., user of computing device 101) to provide feedback after interacting with the feature or function of the software product. For instance, such a time may be determined based on when the user provides feedback via the feedback widget after such a widget appears to the user via the user interface of computing device 101.

"User acceptance time," as used herein, refers to the amount of time for the user (e.g., user of computing device 101) to accept or approve the feature or function of the software product. For example, such a time may be determined by monitor engine 201 as corresponding to the time duration from when the user starts interacting with the feature or function of the software product until the time the user indicates an acceptance or approval of such a feature or function. As discussed above, such acceptance or approval may be learned from surveys, feedback, an expert analysis of a session recording, etc.

In step 502, profile engine 202 of testing system 104 generates user behavior profiles based on the monitored user behavior.

As discussed above, in one embodiment, profile engine 202 is configured to generate user behavior profiles based on the monitored user behavior in connection with the features and/or functions of the software product. In one embodiment, the information collected by monitor engine 201 discussed above is contained within such a user behavior profile.

A "user behavior" profile, as used herein, refers to a profile that includes behavior characteristics of users. As discussed above, "behavior characteristics," as used herein, refers to the manner of behaving or conducting oneself.

In one embodiment, such user behavior profiles are generated for users (e.g., users of computing devices 101), such as users utilizing a particular software product. In one embodiment, such user behavior profiles are generated by profile engine 202 using an approach called "evolving agent behavior classification based on distributions of relevant events (EVABCD)."

In one embodiment, profile engine 202 generates such user behavior profiles via online surveys filled out by the users (e.g., users of computing devices 101) in connection with the features and/or functions of the software product. In one embodiment, profile engine 202 utilizes online survey software and questionnaire tools to obtain behavior characteristics of users, such as Typeform®, Feedier®, HubSpot®, SurveyMonkey®, Crowdsignal®, etc.

In one embodiment, such generated user behavior profiles are generated for the purpose of determining the different types of behavior characteristics among a target audience of a software product. As a result, such behavior characteristics may be directed to users of a particular software product.

In one embodiment, such generated user behavior profiles are generated for the purpose of determining the acceptance rate of the features and/or functions of the software product. "Acceptance rate," as used herein, refers to the rate (percentage) at which the particular feature or function of the software product is deemed to be adequate or suitable to the user. For example, if ten users were monitored for their behavior in connection with feature A, and six of those users were deemed to accept such a feature to be adequate or suitable to them and four of those users deemed such a feature to not be adequate or suitable, then the acceptance rate is $6/10$ (60%). In one embodiment, acceptance is determined based on user behavior analytics discussed above. For example, such user behavior analytics may include information, such as user provided feedback regarding the feature or function. For instance, the user may indicate that he/she was impressed by the feature or function. In another example, the user may indicate that he/she was dissatisfied with the feature or function. In one embodiment, profile engine 202 utilizes natural language processing to identify keywords that signify acceptance or rejection of the feature or function of the software product, where such keywords (e.g., dislike, enjoyed) are listed in a data structure (e.g., table). In one embodiment, such a data structure is stored in a storage device of testing system 104 (e.g., memory 405, disk drive 408).

In connection with storing the acceptance rate of the features and/or functions of the software product in the user behavior profiles, such features and/or functions may be categorized (e.g., user interface objects, language, transcription, input) in the user behavior profiles. Such categorization may be determined by an expert or by profile engine 202 via a data structure (e.g., table) storing a listing of features and functions as well as the associated category. In one embodiment, such a data structure is stored in a storage device of testing system 104 (e.g., memory 405, disk drive 408).

By having such features and/or functions classified in the user behavior profiles, the acceptance rate for particular categories of features and/or functions may be determined based on the user behavior (behavior characteristics). Such information will later be used to generate the behavioral model score representing the acceptance rating for a type of persona for a given category of a feature or function of the software product that includes the feature or function of the software product for which the rate of acceptance is to be determined (i.e., the feature or function of the software product for which user acceptance testing is to be performed).

In one embodiment, such generated user behavior profiles are generated for the purpose of determining the time frame needed for testing, which may be based on the feedback time and the user acceptance time.

In step 503, testing system 104 stores the generated user behavior profiles, which are used to determine the acceptance rate and the time frame needed for testing, in a storage medium (e.g., memory 405, disk unit 408).

In step 504, model generator 203 of testing system 104 creates a model to simulate the virtual sponsor users of a target audience to interact with a feature and/or function of a software product for predicting the acceptance rate of the feature and/or function of the software product by the target audience using the stored monitored user behavior (i.e., using the stored user behavior profiles).

As stated above, in one embodiment, model generator 203 uses a machine learning algorithm (e.g., supervised learning) to build a mathematical model based on sample data consisting of user behavior in connection with features and functions of software products. Such data may be obtained from the user behavior profiles. Such a data set is referred to herein as the "training data" which is used by the machine learning algorithm to make predictions or decisions without being explicitly programmed to perform the task. In one embodiment, the training data consists of user behavior in connection with features and functions of software products. The algorithm iteratively makes predictions on the training data as to the acceptance rate of a feature or function of a software product for a target audience. A "target audience," as used herein, refers to the group of people at which the software product being developed is aimed. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the acceptance rate of a feature or function of a software product for a target audience.

In one embodiment, model generator 203 creates such a model using the algorithm discussed below:

$$Y=(z(P(?))\times VTT\times FCA), \qquad \text{EQ (1)}$$

$$z(P(?))=z1(PBM1\times PW1)+(z2(PBM2\times PW2) \qquad \text{EQ (2)}$$

where, as previously discussed, Y is equal to the predicted acceptance rate of a feature or function of a software product for a target audience, z(P(?)) corresponds to the number of personas used in the user acceptance testing and their persona type, VTT corresponds to a time duration, FCA corresponds to the historical feature class acceptance rate, PBM corresponds to the persona behavioral model score and PW corresponds to the persona weight.

A detailed description of predicting the acceptance of features and/or functions of the software product using such a model is provided below in connection with FIG. 6.

FIG. 6 is a flowchart of a method 600 for predicting an acceptance rate of the feature or function of the software product by the target audience in accordance with an embodiment of the present disclosure.

Referring to FIG. 6, in conjunction with FIGS. 1-5, in step 601, profile engine 202 of testing system 104 creates persona type profiles based on the stored monitored user behavior for a plurality of users.

As discussed above, in one embodiment, profile engine 202 is configured to create persona type profiles based on such stored user behavior profiles containing information pertaining to the user behavior monitored by monitor engine 201. "Persona type" profiles, as used herein, refer to profiles directed to certain persona types, such as the behavior characteristics discussed above, such as frustration, laid back, happy, irritable, positive, negative, etc. As a result, such persona type profiles include information, such as the user acceptance rate for that type of persona (e.g., happy) for particular categories of features and functions of software products. In one embodiment, persona type profiles are assigned to the virtual sponsor user that represents a "real" sponsor user with such a persona type. If the target audience is deemed to contain 40% of users with such a persona type, such as by an expert, then a weight of 0.40, represented by PW in the above-equation, may be utilized to determine the acceptance rate of the target audience for a particular feature or function of the software product.

In one embodiment, user behavior profiles include behavior characteristics for each user monitored, including their acceptance or rejection of categorized features and functions of software products. After analyzing such user behavior profiles, profile engine 202 determines the overall class acceptance rate for a particular category of a feature or function of a software product for a particular behavior characteristic or type of persona. For example, user behavior profiles A, C, E, F and G may include information pertaining to those users with a behavior characteristic of being positive in connection with interacting with a feature classified as a user interface object. Based on analyzing such user behavior profiles, profile engine 202 determines the percentage of those users with such a behavior characteristic in accepting such a categorized feature. Such information is then inputted into the persona type profile for such a behavior characteristic (e.g., positive) in connection with such a categorized feature (e.g., user interface object).

In step 602, environment generator 204 of testing system 104 creates a virtual environment for virtual sponsor users to interact with the feature and/or function of a software product.

As stated above, a "virtual environment," as used herein, refers to the virtual space in which the virtual sponsor user interacts with the feature or function of the software product. For example, suppose that testing system 104 is to determine the acceptance rate of the function of using a customizable, portable set of pens, pencils and highlighters to write in a document for the target audience. Environment generator 204 may then generate a pull-down menu on the user interface containing a pencil, pen and highlighter from which the virtual user is to select. In one embodiment, environment generator 204 utilizes software tools to create such a virtual environment, such as Virtualenv, Pipenv, Conda®, In one embodiment, environment generator 204 generates a virtual environment via the use of packages, modules and directories, in which the virtual environment is provided access to certain packages, modules and directories as indicated by an expert, such as those containing software code for generating software objects on a user interface. In one embodiment, a package, module or directory is created, such as by an expert, to generate the feature or function of the software product (for which user acceptance testing is to be performed) to appear in the user interface. The virtual environment is then provided access to such a package, module or directory by environment generator 204.

In one embodiment, the feature or function of the software product, for which user acceptance testing is to be performed, is provided to environment generator 204 by an expert. In one embodiment, code to generate such a feature or function is provided to environment generator 204 by an expert. In one embodiment, code to generate such a feature or function is automatically generated via the use of symbolic expressions (e.g., SymPy symbolic expressions) representing the feature or function for which acceptance testing is to be performed, such as via the use of a software tool of SymPy.

In step 603, virtual sponsor user assigner 205 of testing system 104 assigns each virtual sponsor user with a persona type profile of a target audience.

As stated above, a virtual sponsor user refers to a virtual representation of an actual sponsor user. "Virtual representation," as used herein, refers to symbolizing a real sponsor user via the use of a persona type profile. For example, instead of utilizing an actual sponsor user (e.g., user of computing device 101A) to perform user acceptance testing, such a sponsor user is represented by a virtual sponsor user associated with a persona type profile that characterizes the persona or behavior characteristic of that sponsor user.

In one embodiment, the number of virtual sponsor users used by testing system 104 corresponds to the number of persona type profiles that are used to represent the different personas or behavior characteristics of the target audience, such as determined by the expert. For example, if the target audience is deemed to contain the six persona types of frustration, laid back, happy, irritable, positive and negative, then six virtual sponsor users will be used by testing system 104 to represent the actual or real sponsor users. Such virtual sponsor users will then be assigned the appropriate six persona type profiles by virtual sponsor user assigner 205.

In step 604, simulator 206 of testing system 104 simulates the interactions of the virtual sponsor users with the feature and/or function of the software product.

As stated above, in one embodiment, simulator 206 utilizes the automated usability evaluation (AUE) process to simulate the interactions of the virtual sponsor users with the feature and/or function of the software product. In one embodiment, execution times and completion rates of the features and/or functions of the software product are carried out with the AUE process using GOMS based methods.

In one embodiment, simulator 206 uses a mathematical description of the software product, which is composed of equations that duplicate the functional relationships within the software product, including the feature and/or function of the software product for which user acceptance testing is to be performed. In one embodiment, such a mathematical description is provided by an expert. In one embodiment, simulator 206 simulates the interactions of such features and/or functions of the software product using persona type profiles associated with virtual sponsor users. For example, such persona type profiles may indicate that certain types of features or functions are more commonly accepted by users with a certain persona or behavior characteristic. For instance, features or functions concerning syntax may be more commonly accepted by users with a persona type of being happy or laid back as opposed to a persona type of being irritable. As a result, in simulating a software product with a feature of now supporting LaTeX syntax, simulator 206 takes into consideration such persona type profiles in simulating interactions with such a feature by different virtual sponsor users associated with different persona type profiles.

In one embodiment, an expert provides to simulator 206 the steps, location, theme, color scheme, etc. of the feature or function (for which user acceptance testing is to be performed) to be simulated by simulator 206. Such steps, location, theme, color scheme, etc. of the feature or function of the software product are used to simulate the interactions of the virtual sponsor users to the feature or function (for which user acceptance testing is to be performed) using the associated persona type profiles.

In one embodiment, simulator 206 utilizes the SIMU-LIA® simulation tool by Dassault Systemes. In another embodiment, simulator 206 utilizes software tools, such as OpenModelica, CoCoVila, Adobe® Captivate, Atomi ActivePresenter®, ITyStudio, Uptale®, etc. to simulate the interactions of the virtual sponsor users with the feature and/or function of the software product.

In one embodiment, in connection with the simulation performed by simulator 206, interactions are added and actions to each such interactions are assigned based on the persona type profiles assigned to the virtual sponsor users. For example, features or functions concerning syntax may be more commonly accepted by users with a persona type of being happy or laid back as opposed to a persona type of being irritable. As a result, a persona type profile may indicate an action of scrolling to a different screen upon being presented an option using LaTeX syntax for a user with a persona type of being irritable; whereas, the persona type profile may indicate an action of clicking on an icon representing the option of using LaTeX syntax upon being presented an option of using the LaTeX syntax for a user with a persona type of being laid back. In one embodiment, such interactions are identified and learned from the created model and inputted into the persona type profile by profile engine 202.

In step 605, tracker 207 of testing system 104 tracks the simulated interactions of the virtual sponsor users with the feature and/or function of the software product. As stated above, in one embodiment, tracker 207 utilizes software tools, such as OpenModelica, CoCoVila, Adobe® Captivate, Atomi ActivePresenter®, ITyStudio, Uptale®, etc. to track the simulated interactions of the virtual sponsor users with the feature and/or function of the software product.

In step 606, model generator 203 of testing system 104 determines the rate of acceptance of the feature and/or function for the target audience.

As discussed above, in one embodiment, model 306 (model generated by model generator 203) generates an output 307 corresponding to the predicted acceptance rate of a feature or function of a software product for a target audience. In one embodiment, such an output is generated using the algorithm of equations EQ(1) and EQ(2).

As a result of the foregoing, the embodiments of the present disclosure provide a means for performing user acceptance testing in a swiftly manner that is cost effective by simulating and tracking interactions of virtual sponsor users (as opposed to real sponsor users) with features and/or functions of the software product, where such virtual sponsor users are assigned a persona type profile of a target audience, thereby determining the rate of acceptance of the feature and/or function for the target audience.

Furthermore, the principles of the present disclosure improve the technology or technical field involving user acceptance testing. As discussed above, user acceptance testing is a formal testing of a software product with respect to user needs, requirements, and business processes conducted to determine whether the software product satisfies the acceptance criteria (e.g., requirements of a specification)

and to enable the user, customers or other authorized entity to determine whether to accept the software product. User acceptance testing consists of a process of verifying that a user accepts the software product. It is not system testing (ensuring software does not crash and meets documented requirements) but rather ensures that the software product will work for the user (i.e., tests that the user accepts the software product). In particular, user acceptance testing is used to determine whether the user will accept modifications to the features or functions of the software product, such as a new functionality. Such testing may be undertaken by a subject-matter expert (SME), preferably the owner or client of the software product under test, and provide a summary of the findings for confirmation to proceed after trial or review. Additionally, such testing may be undertaken by "sponsor users," which are real users or potential users that bring their experience and expertise to verify that the software product works for the user. Unfortunately, software developers desire to release modifications to the software product, such as new features, quickly. As a result, it may not be possible to obtain enough sponsor users and/or subject-matter experts to perform user acceptance testing and provide feedback to determine the impact of the modification. Furthermore, even when sponsor users and/or subject-matter experts are available to provide early feedback, it is expensive and time consuming to work with these users to validate and ensure what is delivered will be well received and accepted. Hence, there is not currently a means for effectively performing user acceptance testing in a swiftly manner that is cost-effective.

Embodiments of the present disclosure improve such technology by creating a virtual environment for virtual sponsor users to interact with a feature or a function of a software product. A "virtual environment," as used herein, refers to the virtual space in which the virtual sponsor user interacts with the feature or function of the software product. "Virtual sponsor users," as used herein, refer to the virtual representations of actual or real sponsor users. "Virtual representation," as used herein, refers to symbolizing a real sponsor user, such as via the use of a persona type profile. Each of the virtual sponsors users are then assigned a persona type profile of a target audience. A "persona type" profile, as used herein, refers to a profile that includes the character traits of a user, such as a user or member of the target audience. "Character traits," as used herein, refer to the personality or qualities of the user, such as emotions, tendencies, idiosyncrasies, curiosity, generosity, integrity, loyalty, devotion, kindness, sincerity, self-control, etc. Interactions of the virtual sponsor users with the feature or the function of the software product are then simulated and tracked. The rate of acceptance of the feature or the function of the software product is then determined based on such tracked interactions. In this manner, user acceptance testing is performed in a swiftly manner that is cost effective. Furthermore, in this manner, there is an improvement in the technical field involving user acceptance testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for performing user acceptance testing, the computer-implemented method comprising:

creating persona type profiles based on stored monitored user behavior for a plurality of users, wherein said persona type profiles include persona type information for particular categories of features and functions of software products;

generating user behavior profiles based on said stored monitored user behavior for said plurality of users, wherein said user behavior profiles include acceptance or rejection information for said particular categories of features and functions of said software products;

creating a virtual environment for virtual sponsor users to interact with a feature or a function of a software product, wherein said virtual sponsor users are virtual representations of real sponsor users, and wherein said real sponsor users test software products for user acceptance;

assigning each of said virtual sponsor users with a persona type profile of a target audience;

simulating interactions of said virtual sponsor users with said feature or said function of said software product using an automated usability evaluation (AUE) process to determine an execution time and a completion rate of said feature or said function of said software product;

tracking said interactions of said virtual sponsor users with said feature or said function of said software product; and determining a rate of user acceptance of said feature or said function of said software product for said target audience based on said tracked interactions of said virtual sponsor users with said feature or said function of said software product.

2. The computer-implemented method as recited in claim 1, further comprising:

monitoring user behavior for said plurality of users in connection with features and functions of said software products.

3. The computer-implemented method as recited in claim 2, further comprising:

storing said generated user behavior profiles.

4. The computer-implemented method as recited in claim 3, further comprising:

creating a model to simulate said interactions of said virtual sponsor users with said feature or said function of said software product using said stored generated user behavior profiles.

5. The computer-implemented method as recited in claim 4, wherein said model is created using supervised learning.

6. A computer program product for performing user acceptance testing, the computer program product comprising one or more computer readable storage media having program code embodied therewith, the program code comprising programming instructions to perform:

creating persona type profiles based on stored monitored user behavior for a plurality of users, wherein said persona type profiles include persona type information for particular categories of features and functions of software products;

generating user behavior profiles based on said stored monitored user behavior for said plurality of users, wherein said user behavior profiles include acceptance or rejection information for said particular categories of features and functions of said software products;

creating a virtual environment for virtual sponsor users to interact with a feature or a function of a software product, wherein said virtual sponsor users are virtual representations of real sponsor users, and wherein said real sponsor users test software products for user acceptance;

assigning each of said virtual sponsor users with a persona type profile of a target audience;

simulating interactions of said virtual sponsor users with said feature or said function of said software product using an automated usability evaluation (AUE) process to determine an execution time and a completion rate of said feature or said function of said software product;

tracking said interactions of said virtual sponsor users with said feature or said function of said software product; and determining a rate of user acceptance of said feature or said function of said software product for said target audience based on said tracked interactions of said virtual sponsor users with said feature or said function of said software product.

7. The computer program product as recited in claim 6, wherein the program code further comprises the programming instructions to perform:

monitoring user behavior for said plurality of users in connection with features and functions of said software products.

8. The computer program product as recited in claim 7, wherein the program code further comprises the programming instructions to perform:

storing said generated user behavior profiles.

9. The computer program product as recited in claim 8, wherein the program code further comprises the programming instructions to perform:

creating a model to simulate said interactions of said virtual sponsor users with said feature or said function of said software product using said stored generated user behavior profiles.

10. The computer program product as recited in claim 9, wherein said model is created using supervised learning.

11. A system, comprising:

a memory for storing a computer program for performing user acceptance testing; and a processor connected to said memory, wherein said processor is configured to execute programming instructions of the computer program comprising:

creating persona type profiles based on stored monitored user behavior for a plurality of users, wherein said persona type profiles include persona type information for particular categories of features and functions of software products;

generating user behavior profiles based on said stored monitored user behavior for said plurality of users, wherein said user behavior profiles include acceptance or rejection information for said particular categories of features and functions of said software products;

creating a virtual environment for virtual sponsor users to interact with a feature or a function of a software product, wherein said virtual sponsor users are virtual representations of real sponsor users, and wherein said real sponsor users test software products for user acceptance;

assigning each of said virtual sponsor users with a persona type profile of a target audience;

simulating interactions of said virtual sponsor users with said feature or said function of said software product using an automated usability evaluation (AUE) process to determine an execution time and a completion rate of said feature or said function of said software product;

tracking said interactions of said virtual sponsor users with said feature or said function of said software product; and determining a rate of user acceptance of said feature or said function of said software product for said target audience based on said tracked interactions of said virtual sponsor users with said feature or said function of said software product.

12. The system as recited in claim 11, wherein the programming instructions of the computer program further comprise:

monitoring user behavior for said plurality of users in connection with features and functions of said software products.

13. The system as recited in claim 12, wherein the programming instructions of the computer program further comprise:

storing said generated user behavior profiles.

14. The system as recited in claim 13, wherein the programming instructions of the computer program further comprise:

creating a model to simulate said interactions of said virtual sponsor users with said feature or said function of said software product using said stored generated user behavior profiles.

\* \* \* \* \*